May 27, 1958 — E. F. HUTCHINS — 2,836,011
GLASS ENVELOPE FORMING AND SEALING APPARATUS
Filed Feb. 3, 1956 — 2 Sheets-Sheet 1
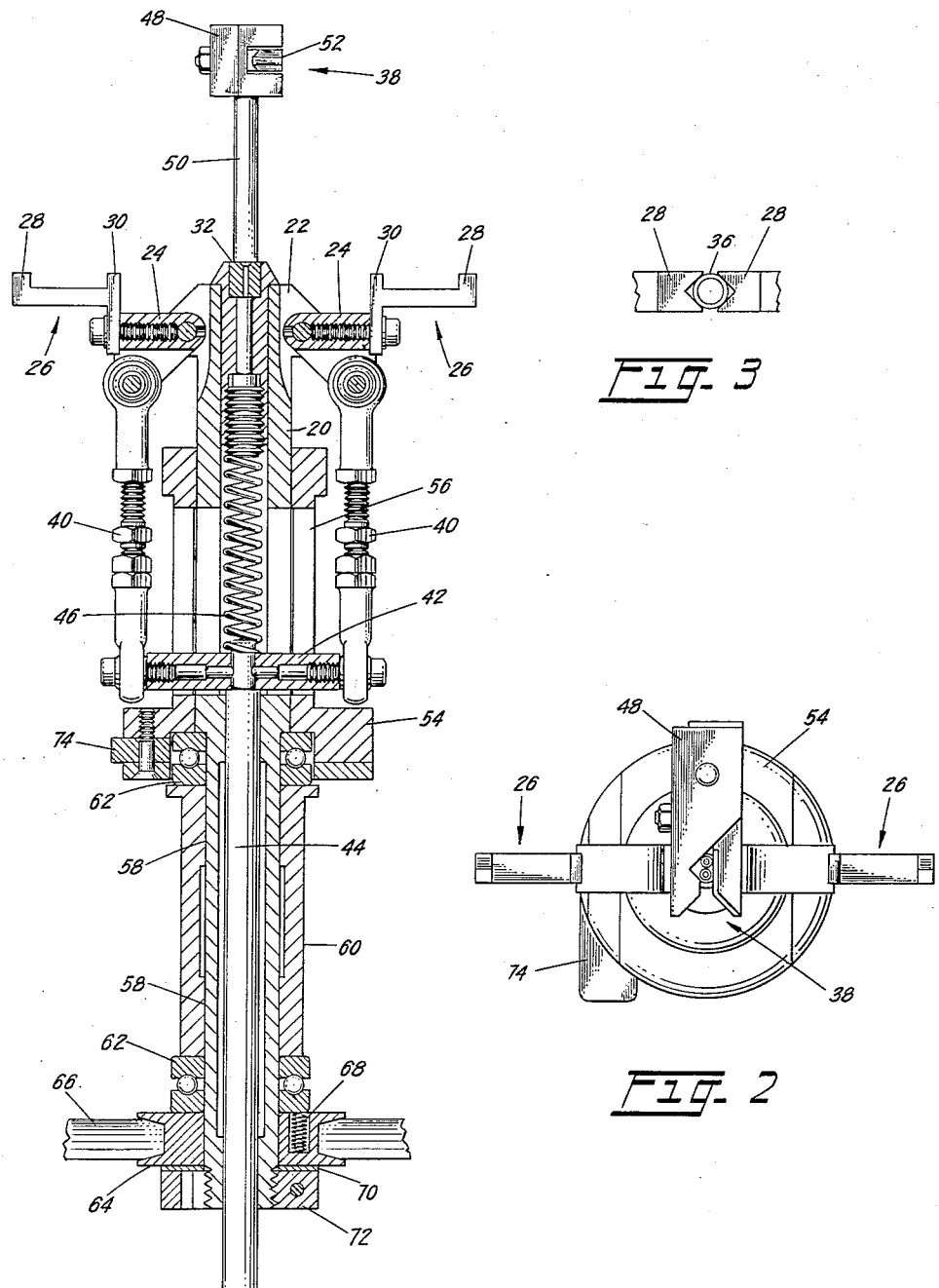
INVENTOR:
ERWIN F. HUTCHINS
BY Lawrence Burns,
ATTORNEY

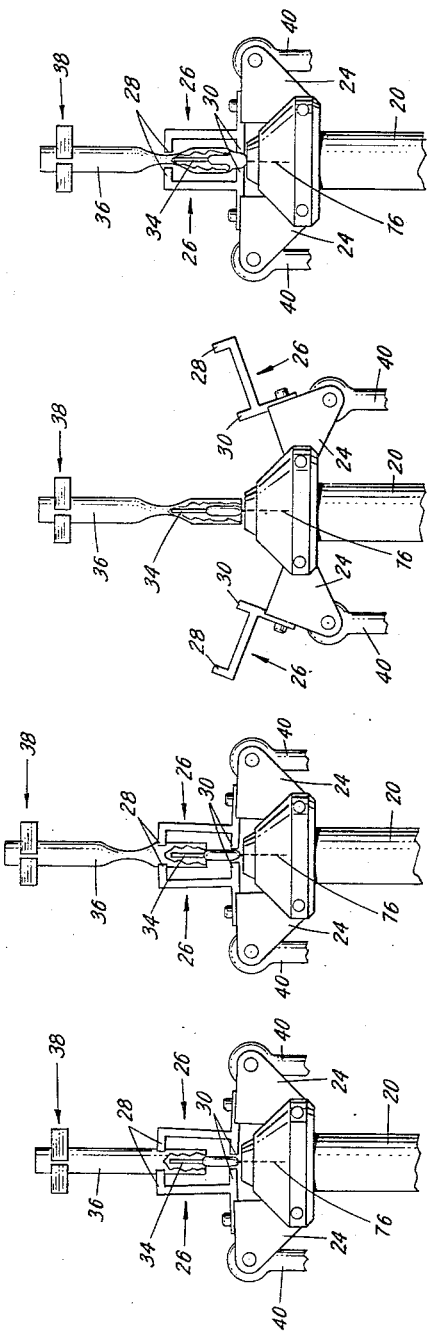

United States Patent Office 2,836,011
Patented May 27, 1958

2,836,011
GLASS ENVELOPE FORMING AND SEALING APPARATUS

Erwin F. Hutchins, Waldoboro, Maine, assignor to Sylvania Electric Products Inc., Salem, Mass., a corporation of Massachusetts Application February 3, 1956, Serial No. 563,211

1 Claim. (Cl. 49—2)

This invention relates to apparatus employed in the manufacture of electrical devices which have internal elements sealed within tubular glass envelopes, particularly when the devices are small.

Such devices, particularly miniature neon lamps and glow starters for fluorescent lamps, have often been made from an open glass tube by sealing one end of the tube around one or more lead-in wires attached to the internal elements, then heating another portion of the tube to a plastic state and drawing the tube to decrease the diameter of the heated portion. This results in a tube with lead-in wires extending from one sealed end, the other end open, and a portion of restricted diameter at a region intermediate the ends.

The intense heat directed upon the intermediate portion of the bulb after the internal elements are in place, may tarnish and deform the latter, and they may become embedded in the softened glass, while the heated portion of the tube is being drawn to a smaller diameter. These difficulties can be overcome by drawing the intermediate portion of the bulb before sealing the lead-in wires through an end thereof.

An object of the present invention is to carry out such a sequence of steps on automatic machinery. A particular object of the invention is to provide a novel head for holding and manipulating a glass tube in such a series of steps.

These and other objects are attained in accordance with my invention by a pair of combination tube-holding and press-forming jaws one of which is installed on each of a pair of co-acting movable jaw mounting blocks of a glass working head. The tube-holding portion is spaced from the press-forming portion of each jaw in such a manner that one end of the tube may first be gripped by the tube-holding portions of the jaws for forming the restriction. Because of the relative positioning, the same end of the tube is thereafter engageable by the press-forming portions for forming a press seal about lead-in wires connected to the internal elements, without, at the same time, bringing the tube holding portions again into contact with the tube.

Further objects, advantages and novel features of my invention will be clarified from the following description of an illustrative embodiment thereof taken in connection with the accompanying drawings in which:

Figure 1 is a view in cross-section of a glass working head incorporating jaws according to my invention;

Figure 2 is a plan view of the head;

Figure 3 is a plan view of the jaws shown holding a glass tube;

Figures 4–7 are schematic views of a portion of the head shown at various stages in the fabrication of a glo-bottle.

An exemplary embodiment of my invention will now be described in conjunction with a head shown in Figure 1 which may be advantageously mounted on a turret type machine well known in the lamp making art. In such a machine a plurality of similar heads are carried on a movable turret through a closed path to a plurality of work stations. The heads are operated by engagement with fixed cam tracks disposed along the path and the heating of articles carried by the heads may be accomplished by gas burners positioned adjacent said path.

The head shown in Figure 1, includes a rotatable spindle 20 having a slotted head 22 in which mounting blocks 24 are hingedly arranged. Each block 24 carries a dual purpose jaw indicated at 26 provided with a V-shaped tube-gripper 28 (shown in Fig. 3), and an integral press finger 30. An insert 32 mounted within the spindle 20 is formed for positioning internal elements 34 shown in Figure 4. Tube 36, also shown in Figure 4, is gripped by a clamp indicated at 38 and by grippers 28.

Actuation of the jaws 26 is effected through tie rods 40 each pivotally connected at one end to a yoke 42 and at the other end to one of the blocks 24. The yoke 42 is fixed to the upper end of rod 44 which is slidable within the spindle 20 and urged downwardly by a compression spring 46. Typically, when the head is mounted on a machine of the type already discussed, the lower end of the rod 44 contacts a cam track which causes the rod to move upwardly against the bias of the spring 42 when closure of the jaws 26 is necessary.

The clamp 38 includes a notched positioner 48, best seen in Figure 2, fast on post 50, and a finger 52 pivoted on the post 50 and urged into gripping relation with a tube 36 by a compression spring, not shown. The post 50 is fixedly upstanding on flange 54 of outer sleeve 56. In order to permit forming a restriction in the tube 36, the sleeve 56 is slidable upwardly, from the position in which it is shown, when the jaws 26 are closed. Upward motion of the sleeve 56 may be provided either manually or, when the head is installed in a lamp making machine, by means of an elevator mechanism common in the art.

The spindle 20 is journalled in bearing portions 58 of mounting sleeve 60. Rotation of the spindle 20, which is additionally equipped with a thrust bearing 62 at either end of the sleeve 60, is supplied through a sheave 64 which is journalled on the lower end thereof. A V-belt 66 which engages the sheave 64 may be suitably driven on the machine. A number of compression springs 68 is arranged in the sheave 64 for urging the lower surface thereof into driving engagement with friction washer 70. The washer 70 is mounted on collar 72 which is fast on the lower end of the spindle 20. This frictional drive arrangement allows the rotation of the spindle 20 to be arrested by engagement of projection 74, on flange 54, with a suitably positioned fixed track.

The operation of my apparatus will now be explained with particular reference to Figs. 4–7 which schematically illustrate various stages in the fabrication of an envelope having internal elements enclosed therein. As a first step the internal elements 34 are nested in insert 32 by their lead-in wires 76 and the tube 36 is placed in the grasp of the clamp 38, as shown in Figure 4. Rotation of the spindle 20 is arrested to permit positioning of the elements 34 and of the tube 36 by the operator. After the tube 36 has been positioned in the clamp 38, the tube grippers 28 close about the lower end of the tube, rotation of the spindle 20 is started and flames from gas burners are directed to the intermediate portion of the tube disposed between the clamp 38 and the grippers 28. It will be appreciated that such flames are directed to a portion of the tube 36 remote from the elements 34, thereby avoiding damage to the elements.

After the intermediate portion of the tube 36 has reached a plastic state, the clamp 38 is elevated to form a restricted passage in the intermediate portion, as shown in Figure 5. The grippers 28 and the clamp 38 continue to hold the tube 36 for a time interval during which the restricted portion cools and solidifies. Thereafter the grippers 28 are caused to release their hold on the tube 36 and the clamp 38 is returned to its original level bringing the lower end of the tube into encompassing relation with the internal elements. With the jaws 26 open, as shown in Figure 6, flames from additional burners are directed to the lower edge of the tube 36 which is thereby rendered plastic. The jaws 26 are made to close a second time, the press fingers engaging the lower end of the tube 36 and forming a press seal about the lead-in wires 76. It will be noted that during this second closure, as shown in Figure 7, the grippers close about the restricted portion of the tube 36 but without contacting it.

What I claim is:

In a head for forming a glass envelope from a glass tube and sealing an electrode assembly therein, the combination of: a seat for said electrode assembly; a clamp, disposed in register with said seat, for gripping said glass tube adjacent one end thereof, said clamp being reciprocable to move said glass tube axially with respect to said seat to effect encompassment of the electrode assembly disposed thereon; and a pair of jaws pivotally mounted on said head and movable into and out of operative relationship with respect to said glass tube, said jaws comprising a pair of coacting tube-grippers for engaging said glass envelope intermediate the ends thereof and a pair of coacting press fingers for engaging said glass envelope at the other end thereof.

References Cited in the file of this patent

UNITED STATES PATENTS

| | | |
|---|---|---|
| 1,019,457 | Graybill | Mar. 5, 1912 |
| 1,695,834 | Whitmore | Dec. 18, 1928 |
| 1,853,911 | McCabe | Apr. 12, 1932 |
| 1,914,205 | Hooper et al. | June 13, 1933 |
| 2,020,729 | Knoeppel | Nov. 12, 1935 |
| 2,530,168 | Knochel et al. | Nov. 14, 1950 |